United States Patent [19]

Glandorf et al.

[11] 4,270,064
[45] May 26, 1981

[54] HEAT EXCHANGE ARRANGEMENT FOR COOLING LUBRICANT FOR VERTICAL ELECTRIC MOTOR THRUST BEARING

[75] Inventors: Frank J. Glandorf; Paul D. Wagner, both of Cincinnati, Ohio; John J. Keuper, Cold Spring, Ky.

[73] Assignee: Siemens-Allis, Inc., Atlanta, Ga.

[21] Appl. No.: 912,979

[22] Filed: Jun. 5, 1978

[51] Int. Cl.³ .............................................. H02K 5/16
[52] U.S. Cl. ...................................... 310/90; 310/64; 310/157; 165/105; 184/104 R; 308/139
[58] Field of Search ............... 310/90, 157, 54, 62–65; 184/6.22, 6.26, 55 R, 104 R; 308/135, 139 R, 157, 163; 277/22; 165/105

[56] References Cited

U.S. PATENT DOCUMENTS

| 3,017,526 | 1/1962 | Luenberger | 310/157 |
| 3,549,922 | 12/1970 | Kostin | 310/157 |
| 3,870,907 | 3/1975 | Hoffman | 310/90 |
| 3,904,256 | 9/1975 | Pfeifer | 308/139 |

*Primary Examiner*—R. Skudy
*Attorney, Agent, or Firm*—Frederick W. Powers, III

[57] ABSTRACT

A vertical electric motor embodying the invention has a housing including a cylindrical frame enclosing a stator, a rotor and a shaft affixed to the rotor and mounted for rotation about a vertical axis, upper and lower end frames, a heat generating thrust bearing supported on the top end frame and rotatably supporting shaft and rotor, and a lubricant-receiving reservoir within the motor enclosure above the top end frame and enclosing the thrust bearing. Liquid lubricant within the reservoir is in heat absorbing and lubricating relation with the thrust bearing. A plurality of finned heat transfer heat pipes are supported within the reservoir with their evaporator end submerged in the lubricant and their condenser end exposed to air within the motor housing above the top surface of the lubricant and enhance heat transfer from the lubricant to the atmosphere. Air inlet apertures and air exhaust apertures are provided in the motor enclosure above the reservoir, and a plurality of fan blades rotatably driven from the shaft draw a high volume of air into the space within the motor enclosure above the lubricant and force the air past the condenser end of the heat pipes and out of the exhaust apertures to thereby substantially increase cooling of the thrust bearing.

10 Claims, 1 Drawing Figure

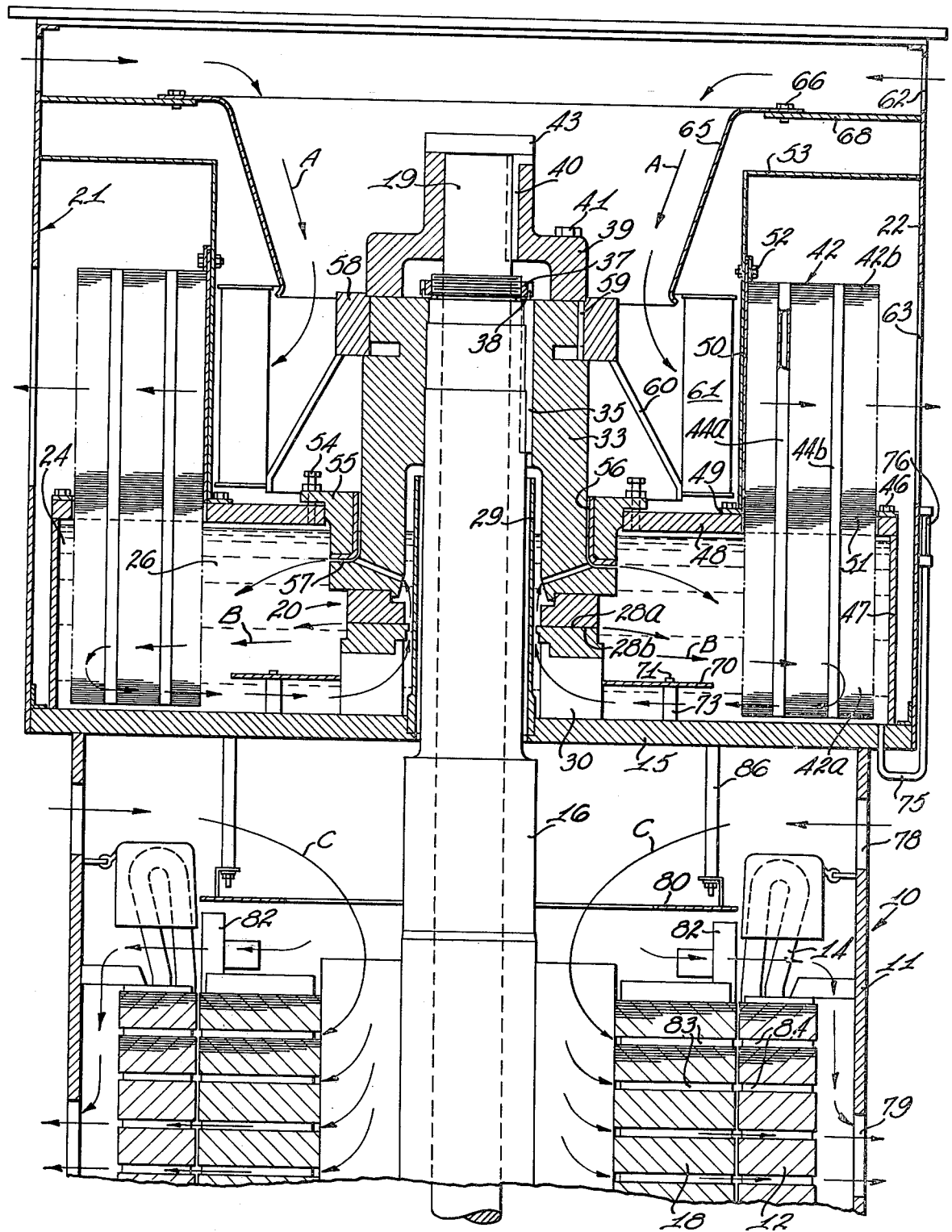

HEAT EXCHANGE ARRANGEMENT FOR COOLING LUBRICANT FOR VERTICAL ELECTRIC MOTOR THRUST BEARING

BACKGROUND OF THE INVENTION

This invention relates to the lubrication and cooling of a thrust bearing in a vertical electric motor.

It is well known to use various types of heat exchanger apparatus to maintain a lubricant, which is in heat absorbing contact with the heat-generating thrust bearing of a vertical electric motor, within a safe operating range of temperatures. Air cooled heat exchangers are frequently used when the size of the electric motor is such that relatively little heat is dissipated from the thrust bearing into the lubricant, and water cooled heat exchangers are used for the lubricant in larger motors which use thrust bearings that generate significantly more heat. In one known air cooled heat exchanger structure the lubricant is contained within a cylindrical reservoir, or well, surrounding the thrust bearing above the top end frame and having hundreds of open-ended pipes sealed to the top and bottom walls of the well, and ambient air is drawn through the pipes to cool the lubricant. Such air cooled heat exchanger apparatus is expensive to construct because of the large number of pipes and also often results in leaks of lubricant at the seals to the pipes in the bottom wall of the reservoir into the interior of the motor housing. Further, the heated air circulating through the pipes enters the interior of the motor housing and makes cooling of the rotor and stator difficult. Another type of heat exchanger is a liquid-to-liquid heat exchanger for the lubricant. This type uses cooling tubes submerged in the lubricant through which water is circulated, and such water cooled heat exchangers require water inlet and water outlet pipes to external pumping equipment which prevent the lubricant cooling means from being self-contained within the motor enclosure. Such water cooled heat exchangers utilize mechanical moving parts in the pumping apparatus which are subject to wear as well as water circulating pipes between the motor enclosure and the installation site which are subject to contamination, corrosion and breakage with the result that such heat exchangers are inconvenient, complex, costly to manufacture and to maintain, and unreliable when subjected to mechanical stresses encountered in earthquakes or similar upheavals.

OBJECTS OF THE INVENTION

It is an object of the invention to provide a vertical electric motor with an improved lubricant cooling heat exchanger which is entirely self-contained within the motor enclosure and will maintain the temperature of the thrust bearing within a satisfactory range and also avoid the disadvantages of prior art apparatus.

A further object is to provide a single and reliable cooling means for the motor lubricant which is completely self-contained within the motor enclosure and does not require mechanical or electrical connections to the surrounding installation site. A still further object is to provide such improved cooling means wherein removal of heat from the lubricant is accomplished simply and reliably because there are no moving mechanical parts subject to wear and no liquid circulation pipes from external apparatus subject to corrosion, contamination and breakage.

Another object is to provide a vertical electric motor with such an improved lubricant cooling heat exchanger that is economical to maintain. A further object is to provide a vertical electric motor with such an improved lubricant coolcant leaking into the interior of the motor housing is avoided. Still another object is to provide a vertical electric motor with such an improved lubricant cooling heat exchanger wherein the heat exchange medium heated by the lubricant does not enter the interior of the motor housing and does not affect cooling of the rotor and stator.

BRIEF DESCRIPTION OF THE DRAWINGS

Additional objects and advantages of the invention will be readily apparent to those skilled in the art from the following detailed description when considered with the accompanying drawing wherein:

FIG. 1 is a side elevation view, partly in cross-section, of the upper portion of a vertical electric motor having a lubricant heat exchanger in accordance with the invention.

SUMMARY OF THE INVENTION

A vertical electric motor embodying the invention has a housing enclosing a stator, a rotor, a shaft affixed to the rotor for rotation about a vertical axis, and a lubricant-receiving reservoir above the rotor and the stator. A heat-generating thrust bearing supported from the housing is disposed within the reservoir and rotatably supports shaft and rotor. Liquid lubricant within the reservoir is in heat absorbing and lubricating relation with the thrust bearing. A plurality of heat transfer heat pipes are supported within the reservoir with their evaporator end submerged in the lubricant and their condenser end exposed to the space within the motor enclosure above the lubricant. Air inlet and air exhaust means including a plurality of fan blades rotatably driven from the shaft draw air into the space within the motor enclosure above the top surface of the lubricant and circulate the air past the shaft draw air into the space within the motor enclosure above the top surface of the lubricant and circulate the air past the condenser end of the heat pipes and out of the motor housing to the atmosphere to thereby enhance cooling of the thrust bearing.

DETAILED DESCRIPTION OF A PREFERRED EMBODIMENT

Referring to the single FIGURE of the drawing, a vertical electric motor incorporating a preferred embodiment of the invention has a multi-part hollow housing 10 including a centrally disposed annular yoke, or frame 11. Magnetic steel laminations are affixed to yoke 11 to form a stator core 12, and the radially inner edges of the laminations are slotted to receive a stator winding 14. The parts of the motor and their functional relationship are well known and require therefore only brief characterization. Housing 10 also includes upper and lower circular end frames 15 affixed to opposite ends of yoke 11. A hollow drive shaft 16 is rotatably mounted within the stator core 12 for rotation about a vertical axis and has a laminated rotor 18 rigidly mounted thereon. Shaft 16 having rotor 18 affixed thereto is supported by a heat-generating thrust bearing designated generally at 20 supported on top end frame 15. A centrifugal pump (not shown) is typically mounted with its impeller coaxial with the motor rotor 18 and its shaft 19 protruding through the hollow shaft 16 so that thrust bearing 20 rotatably supports the weight of the motor rotor, to which is added the downward thrust due to the static weight of the pump impeller and the hydraulic thrust acting on the impeller blades.

Motor housing 10 also has a hollow cylindrical cap portion 21 partially defined by an upstanding annular wall 22 secured to top end frame 15 and forming a weather protecting enclosure. Cap portion 21 encloses a lubricant reservoir, or well 24, which encloses thrust bearing 20. A liquid lubricant 26 such as suitable lubricating oil partially fills reservoir 24 and is in heat absorbing relation with thrust bearing 20. Reservoir 24 is illustrated as being formed by an inner tubular member 29 secured to top end frame 15 in surrounding relation to shaft 16 and by an outer annular member 47 secured to top end frame 15 radially inward from enclosure wall 22. It will be appreciated that in alternative embodiments the cap portion wall 22 can form the outer wall of the reservoir. Thrust bearing 20 has a stationary annular bearing surface 28a and a relatively rotatable annular bearing surface 28b in rotatable sliding relation with each other on a film of lubricant. Top end frame 15 divides lubricant reservoir 24 from the interior of frame 11 which encloses rotor 18 and stator core 12.

Drive shaft 16 protrudes through elongated tubular member 29 which forms the inner annular wall of the reservoir and is affixed at its lower end to top end frame 15 and extends above the top surface of lubricant 26 to prevent the lubricant from entering the interior of yoke 11. A ring-shaped member 30 having stationary thrust bearing surface 28a thereon surrounds tubular member 29 within reservoir 24 and is affixed to top end frame 15 by suitable means not shown. The rotatable annular thrust bearing surface 28b is illustrated as being on a thrust collar 33 which is mounted in fixed relation to shaft 16 so that it will rotate therewith. Several conventional means may be utilized to secure thrust collar 33 to shaft 16, but in the preferred embodiment thrust collar 33 is mounted on shaft 16 with a slip fit and is secured to shaft 16 by a key 35 which transmits torque between the two members. A lock nut 37 threaded onto drive shaft 16 adjacent its upper end transmits 16 may have radially extending tangs which are bent to prevent loosening of lock nut 37 on drive shaft 16.

A generally hat-shaped coupling 39 surrounds pump shaft 19 above the top surface of drive shaft 16 and is affixed to drive shaft 19 by a key 40 so they rotate together. The lower annular surface of coupling 39 abuts against the top surface of thrust collar 33, and coupling 39 may be secured to thrust collar 33 by bolts 41. Pump shaft 19 has a radially extending circumferential flange 43 at its upper end which extends above the top surface of coupling 39 so that the weight of pump shaft 19 is transmitted downwardly from flange 43 to coupling 39 to thrust collar 33 and then to thrust bearing rotatable surface 28b.

A heat pipe assembly 42 is disposed in lubricant well 24 to increase the heat exchange capability with heat-generating thrust bearing 20. Heat pipe assembly 42 is supported so that its lower evaporator portion 42a is submerged in the lubricant 26 and its upper condenser portion 42b is disposed above the top surface of the lubricant 26. Heat pipe assembly 42 is illustrated as having a plurality of radially spaced apart rows of vertically disposed elongated heat pipes such as 44a and 44b. Each heat pipe 44 in known manner may comprise a closed partially evacuated tube containing a wick (not shown) saturated with a vaporizable working fluid (not shown) such as water. Heat applied to the evaporator portion 42a of a heat pipe 44 submerged in the lubricant 26 causes the working fluid in the evacuated tube to vaporize and thus increase the vapor pressure in the tube and absorb heat from the lubricant 26. As a result the vapor rises through the heat pipe 44 to the condenser end 42b disposed above the top surface of lubricant 26 and carries heat energy to the condenser pipe 44 to the condenser end 42b disposed above the top surface of lubricant 26 and carries heat energy to the condenser portion 42b. As the vapor condenses it releases its heat of vaporization and returns as a liquid by the way of the wick (or, in the absence of a wick, by gravity) to the evaporator portion 42a. Radially extending horizontal fins 51 provided along the entire height of the heat tubes 44 effect efficient heat exchange between the condensable medium and ambient air as well as the vaporizable medium and lubricant. The advantages and operating principles of a heat pipe 44 are well known, i.e., it is self-pumping and the vaporizable fluid circulates without external pumping means. A heat pipe may be loosely defined as a heat transfer device which tends to keep both its ends at the same temperature, and such heat pipe is capable of transferring approximately two orders of magnitude as much heat as a solid copper rod of the same cross section.

It will be appreciated that heat pipe assembly 42 will have a multiplicity of heat pipes in a direction essentially perpendicular to the plane of the FIG. 1 view. Heat pipe assembly 42 may be annular in shape (not shown) or, alternatively, a plurality of separate heat pipe assemblies may be disposed within lubricant well 24. Heat pipe assembly 42 may extend through a suitable opening in, and may be secured by bolts 46, to an annular support plate 48 disposed within lubricant well 24 in surrounding relation to shaft 16. Annular support plate 48 may be supported at its radially outer margin by annular member 47 whose lower edge is secured to top end frame 15 to form the outer wall of reservoir 24. Heat pipe assembly 42 may include a horizontal plate 49 affixed by bolts 46 to annular support plate 48 and may also include a vertical plate 50 affixed by bolts 52 to the depending leg of an inverted L-shaped member 53 whose horizontal cross-piece portion is affixed by suitable means (not shown) to annular wall 22 of motor housing cap portion 21.

At its radially inner end annular support plate 48 may be secured by bolts 54 to a ring-shaped retaining guide bearing 55. Retaining guide bearing 55 has a vertically extending circular surface 56 and a horizontal circular surface 57 opposed to and spaced a slight distance from complementary surfaces on thrust collar 33 for the purpose of preventing upward or radial outward movement of thrust collar 33, thereby maintaining thrust bearing rotatable surface 28b in desired rotatable sliding engagement with thrust bearing stationary surface 28a.

Means are provided to draw a high volume of ambient air into housing cap portion 21 and circulate it past the condenser portion 42b of the heat pipe assembly 42. A fan hub 58 is disposed against a horizontal shoulder on thrust collar 33 and is affixed to thrust collar 33 by a key 59. Fan hub 58 carries an inverted frustoconical shaped member 60 which at its lowermost end carries a plurality of arcuately spaced apart, vertically extending fan blades 61 which draw ambient air into housing cap portion 21 and force the air past the condenser section 42b of heat pipe assembly 42.

Suitable air inlet means are provided in housing cap portion 21 such as the illustrated inlet apertures 62 in annular wall 22 adjacent the upper margin thereof, and suitable air exhaust means are similarly provided such as the illustrated exhaust apertures 63 in wall 22 opposite condenser portion 42b of heat pipe assembly 42. Such air inlet and air exhaust means combine with fan blades 61 and an inverted frustoconical air baffle 65 to draw a high volume of ambient may be affixed by bolts 66 to a ring-shaped member 68 secured to annular wall 22 above heat pipe assembly 42.

A ring-shaped oil separator plate 70 disposed in surrounding relation to shaft 16 and thrust bearing 20 directs the oil 26 heated by thrust bearing 20 radially outward past the evaporator portion 42b of heat pipe assembly 42 and permits the cooled oil 26 which falls to the bottom of the lubricant reservoir 24 to return radially inward below oil separator plate 70, thereby causing oil circulation in the path indicated by the arrows B. Oil separator plate 70 may be affixed by bolts 71 to arcuately spaced apart studs 73 which are secured to top end frame 15.

An oil fill pipe 75 on the exterior of motor housing 10 is secured to and communicates through top end frame 15 to the interior of housing cap portion 21 and permits filling reservoir 24 with lubricant 26 to the desired level. A sight glass 76 supported on oil fill pipe 75 permits visual observation of the oil level in reservoir 24 from the exterior of motor housing 10.

Suitable air inlet means into the interior of yoke 11 are provided such as the illustrated inlet apertures 78 in annular frame 11 above stator core 12, and suitable air exhaust means from the interior of the yoke to the atmosphere are also provided such as the illustrated exhaust apertures 79 in annular frame 11 opposite stator core 12. A ring-shaped horizontally extending air baffle plate 80 surrounds shaft 16 above rotor 18 and directs the air entering through inlet apertures 78 past stator coils 14 and thence radially inward so that air flows downward into rotor 18 along the paths indicated by the arrow C. Impeller blades 82 affixed to rotor 18 draw air through inlet apertures 78 and past baffle plate 80 and circulate the air both vertically downward and radially outward through the stator coils 14. The air circulates downward of rotor 18 and then radially outward through horizontal grooves 83 in rotor 18 and through similar horizontal grooves 84 in stator core 12 and then radially outward through the exhaust apertures 79. Air baffle 80 may be supported by studs 86 affixed to the lower surface of top end frame 15. Similar air circulating means (not shown) including air inlet apertures, an air baffle and fan blades are provided at the lower end of the motor and circulate a high volume of air past the stator coils, the rotor and the stator core to aid in cooling of the motor.

The embodiments of the invention in which an exclusive property or privilege is claimed are defined as follows:

1. A lubricant heat exchanger arrangement for a vertical electric motor comprising, in combination, a cylindrical motor housing with its axis disposed vertically and including top and bottom end frames, a stator rigidly mounted in said housing, a rotor rotably mounted in said housing, a drive shaft affixed to said rotor with its axis disposed vertically and extending through said top and bottom end frames, wall means above said top end frame defining a cup-shaped lubricant-receiving reservoir, a thrust bearing disposed in said reservoir and having a stationary annular bearing surface mounted in fixed relation to said top end frame and a rotatable annular bearing surface mounted in fixed relation to said shaft and being in sliding rotatable engagement with said stationary bearing surface so that said thrust bearing rotatably supports said shaft and said rotor, liquid lubricant in said reservoir in lubricating and heat absorbing relation with said thrust bearing, a plurality of heat transferring heat pipes disposed in said reservoir with one end submerged in said lubricant and the other end exposed to air within said housing above said lubricant, and air inlet and air exhaust means for moving air into said housing above said lubricant and for circulating it past said other end of said heat tubes and exhausting it from said housing, said means for moving air including a plurality of fan blades within said housing and means operatively connected to said shaft for rotating said fan blades.

2. A lubricant heat exchanger arrangement in accordance with claim 1 wherein said heat tubes are elongated and disposed vertically and have radially extending fins in heat exchange relation with said lubricant and also with the air within said housing above the top surface of said lubricant.

3. A lubricant heat exchanger arrangement in accordance with claim 1 or 2 wherein said motor housing has a hollow cap portion positioned above said top end frame and enclosing said reservoir, and said air inlet and air exhaust means include apertures in the wall of said housing defining said cap portion.

4. A lubricant heat exchanger arrangement in accordance with claim 3 wherein said motor housing also includes an annular metallic frame enclosing said stator and said rotor and having air inlet apertures therein and air exhaust apertures therein, and second air inlet and air exhaust means for moving air into the interior of said frame through said air inlet apertures and past said rotor and said stator and out of said air exhaust apertures.

5. In a vertical electric motor, the combination of a cylindrical housing, a stator rigidly mounted in said housing, a rotor mounted in said housing for rotation about a vertical axis, a shaft rigidly affixed in coaxial relation to said rotor, wall means defining a cup-shaped lubricant-receiving reservoir within said housing above said rotor and said stator, a thrust bearing disposed within said reservoir and having a stationary annular bearing surface supported from said housing and a rotatable annular bearing surface rigidly connected to said shaft and being in rotatable sliding engagement with said stationary bearing surface so that said thrust bearing rotatably supports said shaft and said rotor, liquid lubricant in said reservoir in heat absorbing relation with said thrust bearing, a plurality of heat transfer heat pipes within said reservoir with one end submerged in said lubricant and the other end exposed to air within said housing above said lubricant, and air inlet and air exhaust means for moving air into said housing above said reservoir and for circulating said air past said other end of said heat tubes and exhausting it from said housing.

6. In a vertical electric motor in accordance with claim 5 wherein said heat pipes are finned and disposed vertically, said housing has air inlet apertures therein above said reservoir and also has air exhaust apertures therein opposite said other end of said heat pipes, and said air inlet and air exhaust means include said air inlet apertures and said air exhaust apertures.

7. In a vertical electric motor in accordance with claim 6 wherein said air inlet and air exhaust means also include a plurality of fan blades within said housing and means operatively connected to said shaft for rotating said fan blades to draw air into said housing through said air inlet apertures and circulate said air past said other end of said heat pipes and out of said exhaust apertures.

8. In a vertical electric motor in accordance with claim 6 or 7 wherein said housing has top and bottom end frames extending transversely of the axis of said shaft and said top end frame forms the bottom wall of said reservoir and supports the portion of said thrust bearing having said stationary annular bearing surface.

9. In a vertical electric motor in accordance with claim 8 wherein said housing has a hollow cap portion secured to said top end frame and enclosing said reservoir and wherein said air inlet apertures and said air exhaust apertures are in the walls of said housing defining said cap portion.

10. In a vertical electric motor in accordance with claim 9 wherein said housing has an annular frame in surrounding relation to said stator and said rotor and having other air inlet apertures and other air exhaust apertures therein, and also including second air inlet and air exhaust means for moving air through said other air inlet apertures and past said rotor and said stator and out of said other air exhaust apertures to thereby aid in cooling said rotor and said stator.

* * * * *